United States Patent [19]
Dunnet

[11] 3,930,042
[45] Dec. 30, 1975

[54] PRODUCTION OF VODKA
[75] Inventor: William Dunnet, Menstrie, Scotland
[73] Assignee: The Distillers Company, Limited, Linden, N.J.
[22] Filed: Dec. 14, 1973
[21] Appl. No.: 425,030

[52] U.S. Cl. .............. 426/475; 426/330; 426/474; 426/493; 426/592
[51] Int. Cl.² ..................... C12G 3/00; C12G 3/12
[58] Field of Search ............ 426/14, 312, 319, 474, 426/475, 493, 494, 477, 422, 330, 592

[56] References Cited
UNITED STATES PATENTS

| 2,054,006 | 9/1936 | Shoeld | 426/422 |
| 2,879,165 | 3/1959 | Hendel | 426/475 |
| 3,560,224 | 2/1971 | Claesson et al. | 426/474 X |
| 3,698,913 | 10/1972 | Malinin | 426/474 |

Primary Examiner—David M. Naff
Attorney, Agent, or Firm—Burton A. Amernick

[57] ABSTRACT

A process for the treatment of aqueous ethyl alcohol which comprises flowing a carbon dioxide-containing gas counter-currently to a stream of the alcohol, in an amount sufficient to provide a spirit having a pH of between about 4.0 and about 5.5, to obtain a neutral spirit which is suitable for use as vodka.

13 Claims, 1 Drawing Figure

U.S. Patent   Dec. 30, 1975   3,930,042
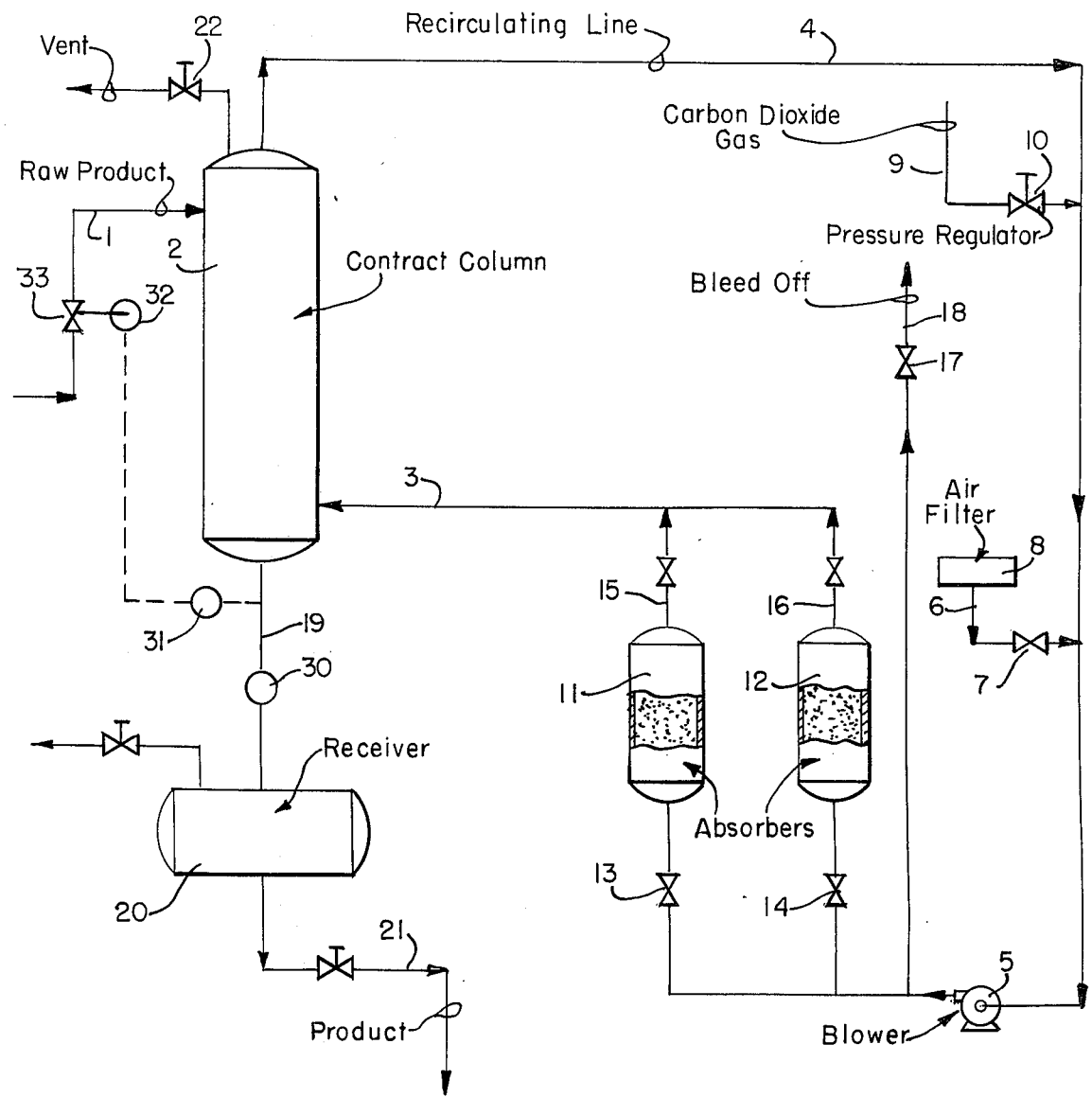

PRODUCTION OF VODKA

BACKGROUND OF THE INVENTION

The present invention is concerned with a process for the treatment of an aqueous ethyl alcohol of the type that contains impurities which are usually found when the alcohol is obtained by fermentation processes. In particular, the present invention is concerned with a process for the purification and stabilization of aqueous ethyl alcohol containing impurities by contacting the ethyl alcohol with a carbon dioxide containing-gas.

In many processes now employed by distillers, aqueous ethyl alcohol has to be properly prepared by distillation and further purification before it can be used for the manufacture of alcoholic beverages. The purification process may often be costly and very cumbersome, especially when additional rectification, filtration over charcoal and aging are concerned. In rectification of alcohol solutions a great number of bubble plates, or equivalent, and a high reflux ratio are required to produce fairly pure aqueous alcohol.

In filtration over charcoal, the filtration must be carried out at a very slow rate (not less than 8 hours when preparing vodka), and requires discarding great quantities of charcoal (6 pounds per 100 gallons of distilled aqueous alcohol). Such discarding constitutes not only a loss of costly charcoal but also of some alcohol contained in the pores of the spent charcoal. Reactivation or regeneration of charcoal is usually not practiced, since it is a cumbersome procedure requiring special equipment. Filtration through charcoal or any other suitable adsorbent or ion-exchange resin always presents a possibility that some objectionable organic or inorganic matter may be leeched out from the adsorbent and contaminate the alcoholic beverage.

It is known that wood, charcoal or coconut charcoal contains a certain amount of sodium and potassium salts which come from the wood or coconut used as the raw material. These salts are soluble in water and hence are found later on in the treated aqueous alcohol. Very often charcoal (activated carbon) is obtained by impregnating the raw material with zinc chloride, which, when heated to high temperatures, evaporates, thus creating a multitude of tin pores. Some of the zinc chloride may, however, remain in the charcoal and then it will be leeched out when used for treatment of water solutions.

For instance, a commercial grain alcohol 190.3 proof containing:

| | | |
|---|---|---|
| Ethyl alcohol | percent | 95.15 |
| Acidity as $CH_3COOH$ | g/100 liters | 1.3 |
| Esters as $CH_3COOC_2H_5$ | g/100 liters | 3.7 |
| Aldehydes as $CH_3CHO$ | g/100 liters | 0.17 |
| Higher alcohols (fusel oil) | g/100 liters | 31.0 |
| Furfural | | Nil |
| Solid extract | | Nil | was diluted with dimineralized water to 100 proof alcohol (50.35% $C_2H_5OH$) and purified by percolating it for over 8 hours through charcoal used in a ratio of at least 1.5 pounds of charcoal for each gallon of the 100 proof alcohol. The product was marketed as "vodka" and showed a solids content of 5.4 g/100 liters. Only a minor part of the above extract was due to the addition of water which, even after demineralization, contained traces of mineral compounds. The balance of the extract apparently came from the charcoal.

In aging whiskey, a long time is required (usually 4 to 7 years) before the product can be marketed. During such aging the contents of acids, esters, aldehydes, ketones and fusel oil is only slightly decreased. However, their content is stabilized and will not change during additional storage. Aging is often accomplished by percolation or filtration of the aqueous alcohol through or with a suitable adsorbent which selectively adsorbs the higher alcohols and other impurities.

It has previously been suggested that good purification of aqueous ethyl alcohol can be readily achieved by blowing a gas such as nitrogen through the solution at substantially atmospheric temperature. For instance, such a procedure is disclosed in U.S. Pat. No. 2,879,165 to Hendel. The gas, according to U.S. Pat. No. 2,879,165, is preferably blown countercurrently to the liquid descending in a contact column which can be a bubble plate, sieve, disc and donut, packed column or similar design. The gas becomes saturated with the vapors of ethyl alcohol and the volatile impurities and is then drawn through a suitable adsorbent which removes at least part of the impurities. The gas is then fully or at least to a great extent recirculated back to the above column for reuse, thus avoiding a substantial loss of ethyl alcohol vaporized by the gas.

Volatile impurities, especially low boiling components, which are not readily adsorbed by the adsorbent, tend to accumulate in the recirculating gas. Hence it is advantageous in some cases to bleed off small amounts of the gas mixture. The bleeding off can be done in a continuous manner from the discharge of the recirculating compressor, or blower. The bled-off gas can be replaced by fresh gas drawn at the suction of the compressor or blower.

The compounds which are removed fully or partially from the impure agueous ethyl alcohol by the gas stream as disclosed in U.S. Pat. No. 2,879,165 are as follows:

| | Degree C. |
|---|---|
| Acetaldehyde, having a boiling point | 21 |
| Ethyl ether, having a boiling point | 34.6 |
| Acrolein, having a boiling point | 52.5 |
| Acetone, having a boiling point | 56.5 |
| Methyl alcohol, having a boiling point | 64.7 |
| Ethyl ethanoate (acetic ester), having a boiling point | 77.15 |
| Isopropyl alcohol, having a boiling point | 82.3 |
| Tert-butyl alcohol, having a boiling point | 82.8 |
| n-Propyl alcohol, having a boiling point | 97.19 |
| Sec-butyl alcohol, having a boiling point | 99.5 |
| Tert-amyl alcohol, having a boiling point | 101.8 |
| Crotonaldehyde, having a boiling point | 104 |
| Isobutyl alcohol, having a boiling point | 108.39 |
| Sec-isoamyl alcohol, having a boiling point | 114 |
| Pyridine, having a boiling point | 115 |
| n-Butyl alcohol, having a boiling point | 117.71 |
| Acetic acid, having a boiling point | 118.1 |
| Active amyl alcohol, having a boiling point | 128 |
| Isoamyl alcohol, having a boiling point | 131.5 |
| n-Amyl alcohol, having a boiling point | 138 |
| Furfural, having a boiling point | 162 |

The lower boiling compounds have a relatively high vapor pressure and hence as easily adsorbed by the recirculating gas. However, some of the higher boiling compounds, like amyl alcohols, show remarkably high vapor pressure in presence of water and hence will also be desorbed to some extent by the recirculating gas.

Such prior process is advantageous in that the adsorption rate of the above impurities from the gas-vapor phase by the usual adsorbent is, generally, much greater than when they are in liquid phase such as being dissolved in aqueous ethyl alcohol. Another discussed advantage of such prior processes is that the adsorbent is not in direct contact with the aqueous alcohol and cannot contaminate the liquid.

Although the above discussed process is very effective for producing high purity ethyl alcohols such as those which can be employed as "vodka", the process of Hendel employing the gases specifically disclosed therein still suffers from the disadvantage of insufficient stabilization of the vodka during storage in the glass bottles normally used in packaging vodka. In particular, storage of vodka in glass bottles and especially white flint glass will have a deleterious effect on the flavor of the vodka and may impart to it a "soapy" taste.

Therefore it is an object of the present invention to provide an improved process for the substantial removal of impurities in order to render or to prepare the product for the manufacture of alcoholic beverages. It is a further object of the present invention to provide an improved process which not only substantially removes the impurities but also stabilizes the product at the same time.

It is a further object of the present invention to improve the shelf stability of the beverage in glass bottles.

BRIEF DESCRIPTION OF THE INVENTION

The present invention is concerned with a process for the treatment of aqueous ethyl alcohol which comprises:

a. flowing aqeuous ethyl alcohol having a pH above 5.5 and being obtained by fermentation, distillation, and rectification processes containing small quantities of impurities which adversely effect the aroma and taste of the alcoholic beverage;

b. flowing a carbon dioxide containing gas countercurrently to the aqueous alcohol;

c. wherein the relative flow rate of carbon dioxide to the aqueous ethyl alcohol is sufficient to provide a spirit having a pH between about 4.0 and about 5.5; and d. then passing the gas containing a substantial amount of vapors of ethyl alcohol, water and the impurities through an adsorption bed consisting of dry solid particles in order to remove the impurities from the gas stream; whereby an aqueous ethyl alcohol having a pH between about 4.0 and about 5.5 without distinctive aroma and taste and which is suitable for use as vodka is obtained.

The FIGURE is a diagrammatic elevation view of a plant suitable for carrying out the process of the present invention.

DESCRIPTION OF PREFERRED EMBODIMENTS

With reference to the figure, the raw product composed of a crude aqueous ethyl alcohol is continuously fed through line 1 to the top of contact column 2. There it flows down countercurrently to the gas stream which enters the column near its bottom through line 3. The product substantially freed from the objectionable impurities, odor and flavor, leaves the contact column through the outlet 19. The pH of the product is measured as it leaves the contact column by means of a pH recorder and controller 31 which in turn is connected to flow controller 32. Flow controller 32 automatically adjusts the opening or closing of valve 33 to control the flow rate of the crude aqueous ethyl alcohol to thereby provide the proper flow rate of aqueous alcohol to carbon dioxide containing gas to provide a product having a preselected pH within the range of about 4.0 to about 5.5, and preferably within the range of about 4.5 to about 5.5.

Of course, this is merely one means by which the proper relative flow rates of the aqueous ethyl alcohol and carbon dioxide containing gas can be achieved. Other means include changing the pressure of the carbon dioxide-containing gas in the system, or changing the contact time in the column by varying the gas velocity. The preferred method is that which is shown in the figure because it is the most convenient means to control the rate of the aqeuous ethyl alcohol and carbon dioxide containing gas.

Also connected to outlet line 19 is a flow meter indicator which would be desirable when making initial adjustments of carbon dioxide pressure and aqueous flow rate. The product is then fed to the receiver 20 and from there through line 21 to storage or directly for bottling. If the product requires some additional clarification it may be filtered through a suitable filter.

The carbon dioxide-containing gas saturated with vapors of alcohol, water and all volatile impurities is drawn through the recirculating line 4 by the blower 5. The carbon dioxide-containing gas discharged by the blower passes through either adsorber 11 or 12 for the adsorption of a substantial quantity of impurities and then returns to the contact column 2.

A small amount of recirculating carbon dioxide-containing gas is continuously or periodically bled off through the valve 17 and line 18 and discharged to the atmosphere. The bleeding off of part of the recirculating gas is a precaution taken to avoid any accumulation in the recirculating gas of objectionable impurities which might not be readily adsorbed into the adsorber. In addition, a portion of the carbon dioxide is dissolved into the aqueous ethyl alcohol whereby it reduces the pH of the aqueous ethyl alcohol to the desired range. Fresh carbon dioxide-containing gas is added into the suction line of the blower through line 9 and valve 10 to replace the carbon dioxide dissolved in the aqueous ethyl alcohol and the gas which was bled off. The amount of carbon dioxide dissolved in the alcohol on the average is usually about one pound of carbon dioxide per 1000 imperial gallons of alcohol. Of course, higher or lower quantities will be observed depending upon such factors as initial pH of the aqueous alcohol and the preselected final pH. In addition, if desired, fresh air may also be introduced through the air filter 8 in line 6 into the suction line of the blower 5 by opening slightly valve 7. It is further recognized that the carbon dioxide containing gas can include other gases such as nitrogen if desired. The nitrogen could be added along with the carbon dioxide through line 9, valve 10 or another line and valve can be placed somewhere on the suction line of blower 5.

The adsorbers 11 and 12 are filled with conventional adsorbents such as activated carbon, charcoal, fullers earth, and the like. The adsorbers are usually interchangeable depending upon the activity of the adsorbent in the given adsorber. Thus, when adsorber 11 contains a spent adsorbent, valves 16 and 14 are opened and valves 15 and 13 are closed in order to permit the recirculating gas to pass through the adsorber 12 containing the fresh adsorbent. Meanwhile, the spent adsorbent in the adsorber 11 is dumped and replaced by fresh adsorbent through manholes, covers and openings which are not shown in the figure. The adsorbent may be activated or regenerated in situ by any known method.

When it is desired to completely exclude oxygen from the recirculating gases, the system has to be prepared as follows:

Before starting to introduce the raw material, vent 22 on top of the contact tower is fully open and a non-oxidizing gas such as nitrogen introduced into the whole system through, for instance, line 9 and valve 10 while blower 5 is running. Both adsorbers may be filled by nitrogen at the same time by keeping valves 13, 14, 15, 16 open. Valves 17 and 7 are kept closed during the introduction of the non-oxidizing gas.

The relative flow rates of the aqueous alcohol and carbon dioxide-containing gas are such as to provide a product having a preselected pH within the range of about 4.0 to about 5.5, and preferably within the range of about 4.5 to about 5.5. Generally the flow rate of the alcohol is between about two gallons and about thirty gallons per minute and preferably between about three and about twelve gallons per minute when employing general commercial sized contact columns which are from about ten to about thirty feet high. Usually the flow rate of the carbon dioxide-containing gas is between about ten and about two hundred cubic feet per minute and preferably fifty to one hundred-fifty cubic feet per minute when employing general commercial sized contact columns. The contact time of the aqueous ethyl alcohol and carbon dioxide-containing gas is generally between about twenty and one hundred-eighty seconds and preferably between about thirty and ninety seconds in commercial sized columns. Usually, the flowing of the carbon dioxide-containing countercurrent to the alcohol is carried out at temperatures within the range of about 0° to about 95°F, and preferably within the range of about 35° to about 80°F. The most preferred temperature is a substantially atmospheric temperature of about 75°F. Generally pressures slightly about atmospheric pressure, which are just sufficient to force the carbon dioxide-containing gas up through downwardly flowing alcohol, are employed. Of course, higher or lower pressures can be used when desired.

In order to further understand the present invention, the following examples are given wherein all amounts are by weight unless the contrary is stated:

EXAMPLE I

Grain neutral spirits 80 proof, which is a commercial vodka diluted with demineralized water and having an average pH of about 7.0, is treated with recirculating carbon dioxide gas in a contact column packed with porcelain Raschig rings. The rate of flow of the aqueous alcohol is three gallons per minute and the rate of flow of carbon dioxide is one hundred cubic feet per minute. The contact time of the liquid and gas is thirty seconds, which is the time for each drop of aqueous alcohol which enters the top of the column to reach the bottom of the Raschig ring packing. The pH of the aqueous alcohol is measured as it leaves the contact column by a E.I.L. model 90 series pH meter and controller which automatically adjusts the flow of the aqueous alcohol into the column so that the final product has a pH of 4.5.

The recirculating carbon dioxide gas reenters the column below the packing and is removed at some distance above the packing, the distance being sufficient for full disengaging of entrained liquid droplets from the gas. The temperature in the contact column is 75°F and the pressure in the top of the column is substantially atmospheric pressure.

Before the introduction of aqueous alcohol, the system, including the adsorption column, is purged with nitrogen from a cylinder. The recirculation of a gas is accomplished by a compressor.

The adsorption system consists of one adsorption column containing twelve pounds of activated charcoal of 12/30 mesh. The adsorber has an internal diameter of six inches and a height of six feet. The height of the bed of the adsorber is two feet. The carbon dioxide gas is blown through the bed upward. Once a day, a small amount of the recirculating gas is bled off to a vent on the discharge end of the compressor and an amount of fresh carbon dioxide, equivalent to the amount bled off, is introduced through a valve located upstream of the compressor. An amount of fresh carbon dioxide, equivalent to the amount dissolved in the alcohol, is continuously introduced through a valve located upstream of the compressor.

The analysis of the feed of the contact column and the product obtained at the end of an eight hour run shows the following results:

|  | Raw Material | Product | Commercial Vodka |
|---|---|---|---|
| Alcohol by volume (%v/v) | 40.0 | 40.0 | 37.5 |
| Extract (g per 100 ml) | not measurable | not measurable | 0.02 |
| Permanganate Time (mins) | 38 | 41 | 41 |
| pH | 7.0 | 4.5 | 6.9 |
| Taste Preference Test (%) | 40 | 85 | 80 |
| | g per 100 liters of absolute alcohol | | |
| Volatile Acidity (as acetic acid) | 0.34 | 0.37 | 0.46 |
| Esters (as ethyl acetate) | Nil | Nil | Nil |
| Aldehydes (as acetaldehyde) | 0.08 | 0.05 | 0.51 |
| Furfural | Nil | Nil | Nil |
| Higher Alochols (as isobutyl alcohol) | Nil | Nil | Nil |

Although the content of the impurity chemically determined does not drastically decrease, the taste preference test shows a product without the distinctive character, aroma and taste and is at least equal to or better than a good commercial grade of vodka. The impurities which could be determined are also below the content of impurities found in good commercial grade vodka.

Vodka prepared according to the above procedure having a pH of 4.5 is bottled in 4/5 quart size white flint bottles, capped and stored for nine months. Twelve bottles are stored at ordinary temperature and six bottles at 110°F. After nine months, the final average pH of the vodka stored at ordinary temperature of 68°F increases to about 5.0 and the average increase of sodium in the vodka in grams per million milliliters of product is too small to measure. After nine months, the final average pH of the vodka stored at 110°F is 6.2 and the average increase of sodium is 3.1 grams/million ml. of product.

EXAMPLE II

Example I is repeated except that the average flow rate of the aqueous ethyl alcohol is changed to about twenty gallons per minute to provide a product having a pH of 5.5. The product is packaged in 4/5 quart size white flint bottles, capped and then stored for nine months as in Example I. The average final pH of the vodka stored at 68°F is 6.2 and the average increase of sodium in the vodka is 0.8 grams per million milliliters of product. The average final pH of the product stored at 110°F for nine months is 7.9 and the average increase in the sodium in the vodka is 3.9 grams per million milliliters of product.

COMPARATIVE EXAMPLE III

Example I is repeated except that the final product has a pH of 6.5. The vodka is then packaged into 4/5 quart size white flint bottles, capped and then stored. Twelve bottles are stored at room temperature of 68°F and six bottles at 110°F as in Example I. After nine months, the bottles stored at room temperature have a final average pH of 8.0 and show an average increase in sodium of 1.0 gram per million milliliters of product. The samples stored at 110°F for nine months have an average pH of 10.6 and an average increase in sodium of 4.7 grams per million milliliters of product.

COMPARATIVE EXAMPLE IV

Example I is repeated except that the pH of the product is 7.0. The product is packaged in 4/5 quart size white flint bottles, capped and then stored. Twelve bottles are stored for nine months at 68°F and six bottles at 110°F for nine months. The final average pH of the vodka stored at 68°F is 9.7 and the average increase in sodium is 1.3 grams per million milliliters of product. The average pH of the product stored at 110°F is 10.8 and the average increase in sodium is 5.0 grams per million milliliters of product.

The results of these storage tests for the above examples are reproduced below:

| Details of storage test | pH of the Vodka Initial | Final (Average) | Average increase in sodium (as Na) (g/1000 l product) |
|---|---|---|---|
| Nine months at ordinary temperature (68°F) | 4.5 | 5.0 | Nil |
|  | 5.5 | 6.2 | 0.8 |
|  | 6.5 | 8.0 | 1.0 |
|  | 7.0 | 9.7 | 1.3 |
| Nine months at 110°F | 4.5 | 6.2 | 3.1 |
|  | 5.5 | 7.9 | 3.9 |
|  | 6.5 | 10.6 | 4.7 |
|  | 7.0 | 10.8 | 5.0 |

As is evident from the above table and from a comparison of Examples I and II with Examples III and IV, it is crucial for the practice of the present invention to employ the carbon dioxide gas in an amount sufficient to provide a final product having a pH between about 4.0 and about 5.5. The products having initial pH's greater than the 5.5 evidenced a much greater increase in their final pH after storage in the white flint bottles and a greater increase in the amount of sodium in the vodka. In addition, the vodkas with initial pH's above the 5.5 as evidenced by their final pH values have a soapy taste which is not observed with the products wherein the initial pH is between 4.0 and about 5.5. In addition, the use of the carbon dioxide gas provides products which have improved taste. Likewise, the lowering of the pH of the vodka to about 4.0 did not adversely affect the smoothness of the product.

It is quite evident from the above table and the comparison of Examples I and II with III and IV that the reduction of the initial pH of the vodka slows down the rate at which sodium is extracted from the white flint glass bottles into the vodka, thereby greatly extending the shelf life of the vodka and delaying the occurrence of the soapy taste in the vodka.

Moreover, the form in which sodium is present in the vodka at the pH of the present invention is more acceptable from a taste viewpoint than the form in which sodium is present in vodka having higher pH's. In particular, it is believed that at least the predominant portion of the sodium in the vodka in the pH range of the present invention is in the form of sodium carbonate; whereas, at higher pH's the sodium is in the form of increasing amounts of sodium hydroxide, which is less desirable from a taste aspect than sodium carbonate. Therefore, the present invention is advantageous even if the amounts of sodium in the vodkas produced according to the present invention were not lower than the amounts in vodkas having higher pH's.

What is claimed is:

1. A process for the treatment of aqueous ethyl alcohol which comprises:
   a. downwardly flowing aqueous ethyl alcohol being aqueous commercial grain neutral spirits having a pH of about 7, and being obtained by fermentation, distillation, and rectification processes and containing small quantities of impurities which adversely affect aroma and taste of the alcoholic beverage;
   b. upwardly flowing a carbon dioxide-containing gas consisting essentially of carbon dioxide countercurrently to said aqueous ethyl alcohol;
   c. wherein the relative flow rate of carbon dioxide to the aqueous ethyl alcohol is sufficient to provide an aqueous alcohol having a pH between about 4.0 and about 5.5,
   d. wherein the relative flow rate of the aqueous ethyl alcohol is from about 2 to about 30 gallons per minute and the flow rate of the carbon dioxide is between about 10 and about 200 cubic feet per minute;
   e. wherein the contact time between the countercurrently flowing carbon dioxide-containing gas and aqueous ethyl alcohol is between about 20 seconds and 180 seconds;
   f. then passing the carbon dioxide-containing gas containing a substantial amount of vapors of ethyl alcohol, water and the impurities through an adsorption bed consisting of dry solid particles in order to remove the impurities from the gas stream; whereby an aqueous ethyl alcohol product having a pH between about 4.0 and about 5.5 without distinctive aroma and taste, and which is suitable for use as vodka, is obtained; and
   g. reusing the carbon dioxide-containing gas for countercurrent flow with fresh quantities of said aqueous ethyl alcohol.

2. The process of claim 1 wherein said aqueous ethyl alcohol is grain neutral spirits obtained by dilution of commercial grain alcohol.

3. The process of claim 1 wherein said dry solid particles are activated charcoal.

4. The process of claim 1 which includes measuring the pH of the aqueous ethyl alcohol product and regulating the flow of the aqueous ethyl alcohol to provide a product having a preselected pH between about 4.0 and about 5.5.

5. The process of claim 1 wherein the pH of the product is about 4.5.

6. The process of claim 1 which comprises flowing said carbon dioxide-containing gas countercurrently to said aqueous ethyl alcohol at a temperature within the range of about 0° to about 95°F.

7. The process of claim 1 which comprises flowing said carbon dioxide-containing gas countercurrently to said aqueous ethyl alcohol at a temperature within the range of about 35° to 80°F.

8. The process of claim 1 which comprises flowing said carbon dioxide-containing gas countercurrently to said aqueous ethyl alcohol at a substantially atmospheric temperature of about 75°F and at a pressure slightly above atmospheric pressure.

9. The process of claim 1 wherein the pH of the aqueous ethyl alcohol product is between about 4.5 and about 5.5.

10. The process of claim 1 wherein said carbon dioxide-containing gas is carbon dioxide.

11. The process of claim 1 wherein said aqueous ethyl alcohol is grain neutral spirits obtained by dilution of commercial grain alcohol; said carbon dioxide-containing gas is carbon dioxide, wherein the carbon dioxide flows countercurrently to the alcohol at substantially atmospheric temperature of about 75°F, and at a pressure slightly above atmospheric pressure; said dry particles are activated charcoal; and the pH of the product is about 4.5.

12. The process of claim 7 wherein said dry solid particles are activated charcoal.

13. The process of claim 7 wherein the pH of the product is between about 4.5 and about 5.5.

* * * * *